United States Patent [19]
McKee

[11] 3,983,952
[45] Oct. 5, 1976

[54] ELECTRIC VEHICLE HAVING BACKBONE CONTAINING TRAY OF POWER CELLS

[76] Inventor: Robert S. McKee, 411 W. Colfax St., Palatine, Ill. 60067

[22] Filed: May 18, 1972

[21] Appl. No.: 254,664

Related U.S. Application Data

[63] Continuation-in-part of Ser. No. 89,689, Nov. 16, 1970, abandoned.

[52] U.S. Cl. ............................. 180/65 R; 74/493; 104/34; 105/51; 180/68.5; 280/87 R; 296/28 J
[51] Int. Cl.² ........................................ B60L 11/18
[58] Field of Search ............... 180/68.5, 65, 60, 54, 180/11; 105/51, 50; 104/34; 74/493; 244/84; 296/28 J; 280/87, 96

[56] References Cited
UNITED STATES PATENTS

| | | | |
|---|---|---|---|
| 659,729 | 10/1900 | Eaton | 180/60 |
| 778,560 | 12/1904 | Whiting | 104/34 |
| 1,165,784 | 12/1915 | Klingelsmith | 180/68.5 |
| 1,526,481 | 2/1925 | Krieger | 180/65 R UX |
| 2,208,710 | 7/1940 | Tjaarda | 180/65 R |
| 2,612,964 | 10/1952 | Hobbs | 180/54 A UX |
| 3,122,244 | 2/1964 | Corso | 104/34 X |

FOREIGN PATENTS OR APPLICATIONS

| | | | |
|---|---|---|---|
| 972,365 | 8/1950 | France | 180/68.5 |
| 251,838 | 5/1926 | United Kingdom | 180/68.5 |

Primary Examiner—M. H. Wood, Jr.
Assistant Examiner—Milton L. Smith
Attorney, Agent, or Firm—Darbo, Robertson & Vandenburgh

[57] ABSTRACT

An electric vehicle of adequate performance and range and of low cost uses a long tray of batteries easily rolled into or from a housing which also comprises a structural backbone of the car. The body provides useful space, such as a passenger compartment on both sides of the backbone, extending down to about the level of the bottom of the backbone, thereby keeping a low center of gravity, and compactness for low wind resistance. The steering wheel is on a swing-arm standing out laterally from the backbone, the backbone supporting the steering shaft in a position not "aimed" at the driver. The steering arm swings out of the way to facilitate access, and in one form of the invention the body top swings open and there are no side doors. Separate V belt drives from the motor through automatic speed-changing pulleys for each side minimize current draw on start-up and acceleration, maximize performance, ensure driving both drive wheels in slippery weather, and permit differential wheel speed on turns. Independent suspension of the drive wheels ("knee action") without universal joints is achieved by using the flexibility of the V belts to permit the driven pulley to rock out of alignment with the drive pulley.

12 Claims, 14 Drawing Figures

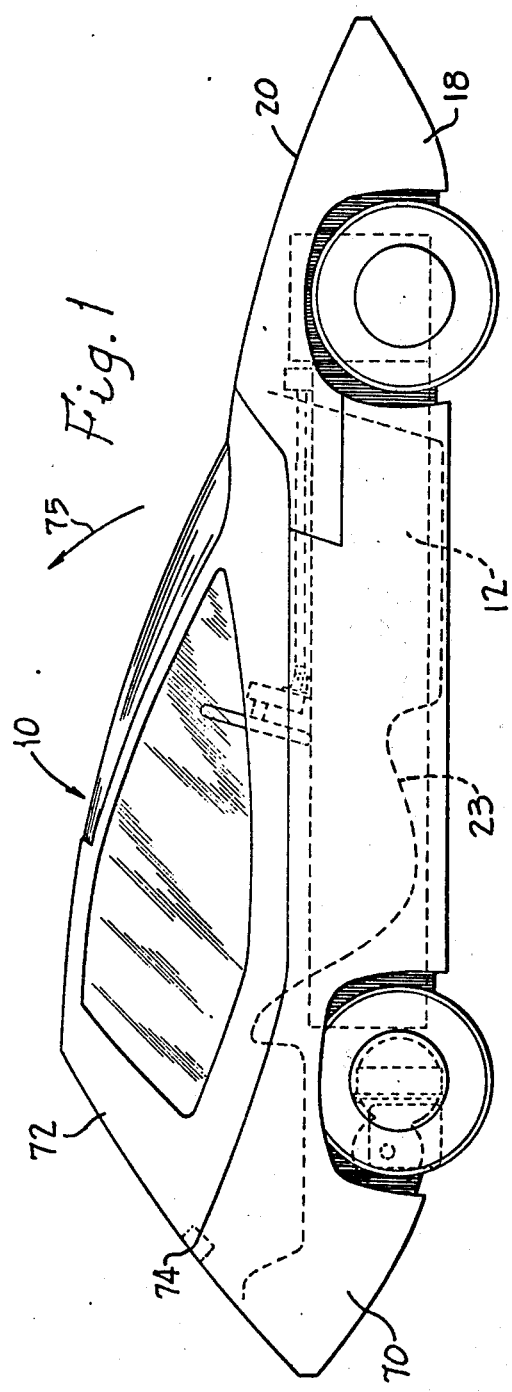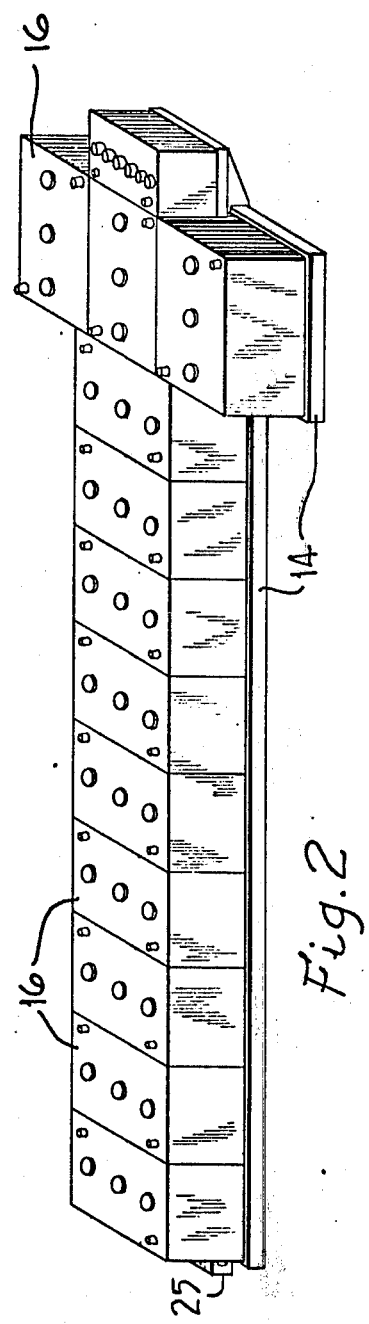

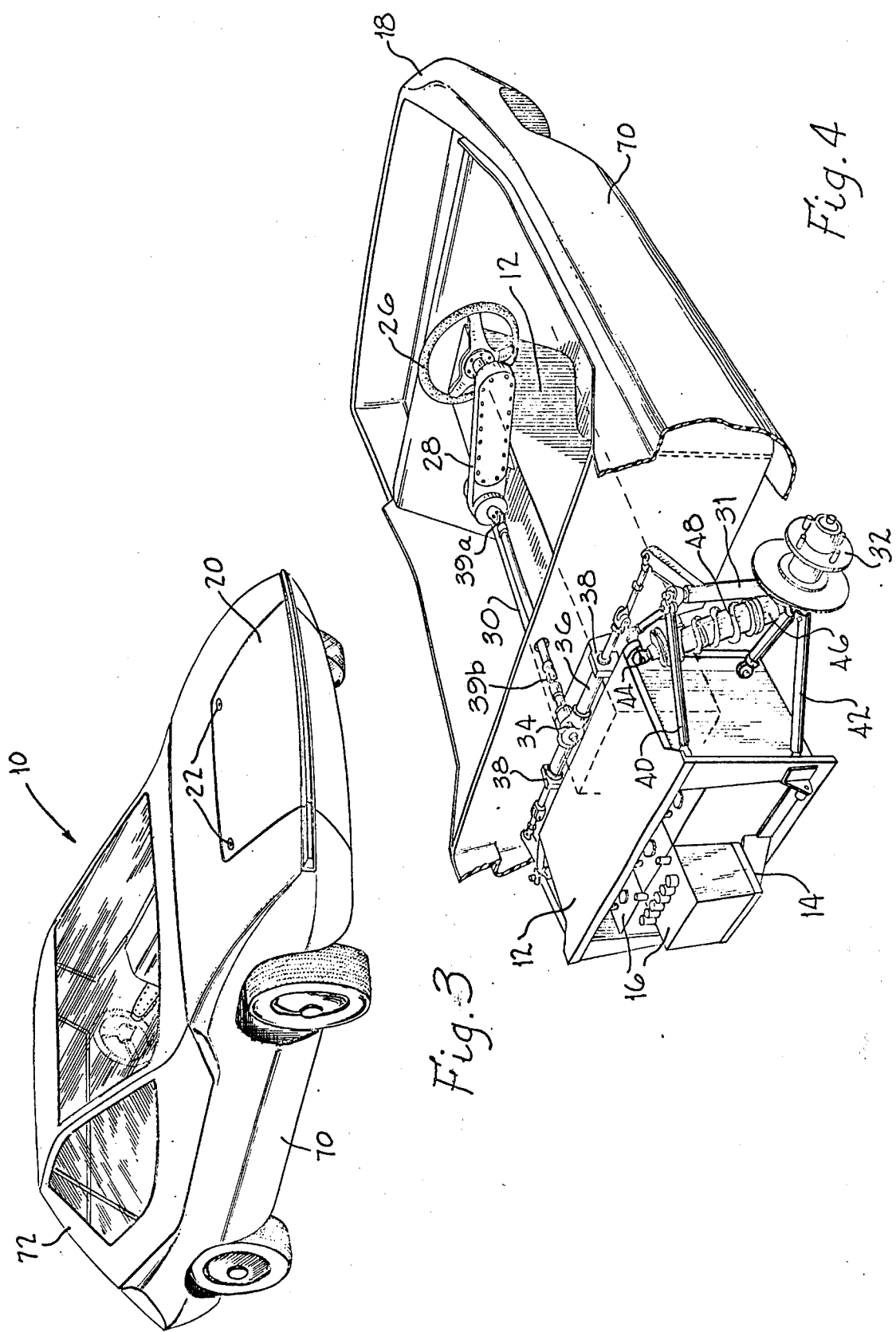

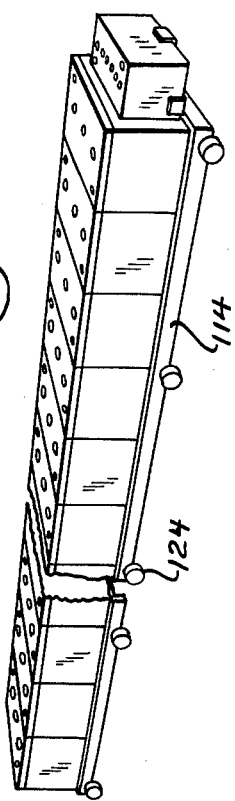
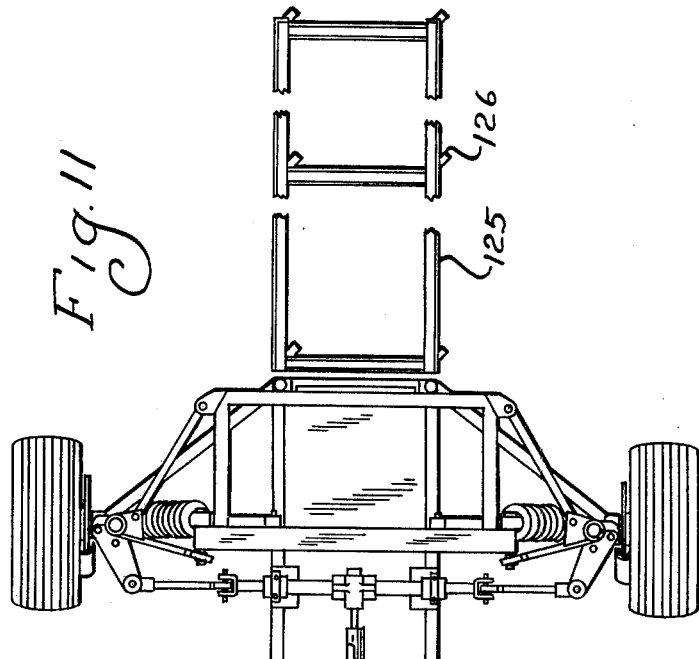
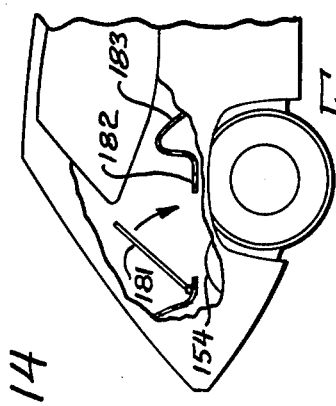
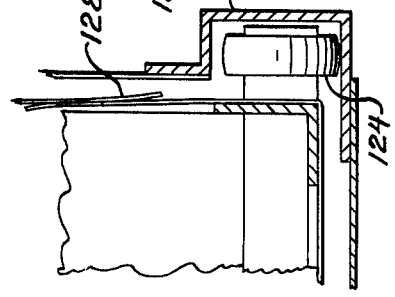
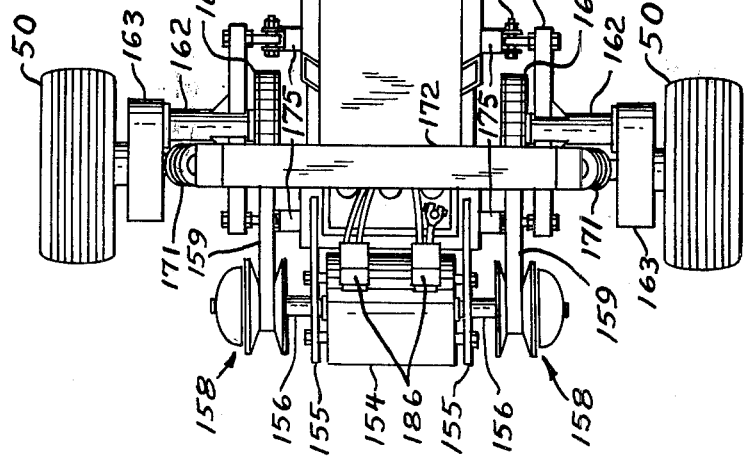

ELECTRIC VEHICLE HAVING BACKBONE CONTAINING TRAY OF POWER CELLS

This application is a continuation-in-part of application Ser. No. 89,689 filed Nov. 16, 1970 and now abandoned.

BACKGROUND OF THE INVENTION

Strenuous efforts have been devoted by many people in recent years to the development of an electric automobile having adequate performance by modern standards. The demand to avoid the air pollution of internal combustion engines has created an unprecedented demand for such a vehicle.

A number of considerations enter into the development of a battery powered electric vehicle. There must be easy access to all batteries for servicing, and for replacement when needed. Providing adequate performance, including speed and acceleration, and range on one charging of the batteries has seemed to be virtually impossible.

Certain basic considerations must be faced by designers regardless of whether they work with internal combustion engine or battery powered electrical vehicles. Among these considerations is the need to provide a low center of gravity so that the vehicle will have maximum stability on curves while traveling at high speeds. Another is the desirability of having the weight distributed somewhat uniformly throughout the length of the vehicle to achieve better road handling characteristics. Still another is the need to have some member of the vehicle serve as a frame or support to which the other members of the vehicle may be secured.

Many of the earliest self-propeled vehicles were powered by batteries and electric motors, and more recently some special purpose vehicles have been, and other variations have been at least vaguely suggested by patents. None taught what is needed to satisfy today's standards.

SUMMARY OF THE INVENTION

A successful electric vehicle requires contributions from all branches of the interrelated problems of adequate battery space, convenient access, weight reduction of the vehicle, weight distribution of components, and cost reduction. The total energy available without recharging will inevitably be limited under present technology, even with the best possible efforts toward providing maximum space for batteries. Therefore performance depends in a sense on weight reduction. Weight reduction and cost reduction both depend on simplification. Cost reduction is essential to make acceptable an automobile in which performance inferior to that of liquid-fuel vehicles must be expected.

One key factor in the successful multipronged approach is to provide the electric vehicle with a hollow backbone which houses a roll-out tray containing power cells. Spare ready-charged battery sets can be substituted in a time comparable to refilling a gasoline tank. Because the backbone also serves the additional function of a structural frame or chassis for the vehicle, cost reduction and weight reduction are facilitated.

By using a body that provides passenger space on both sides of the backbone, all weight is as low as possible, and a very low center of gravity is achieved. Good weight distribution is achieved because the power cells extend through the length of the vehicle.

A further contribution of one form of the invention toward weight and cost reduction is in avoiding doors. The body has two portions, a lower portion which is shaped to fit down over the backbone and provide seating spaces for occupants and an upper or top portion hinged to the lower portion and designed to be swung upward to afford access to the interior of the car. Stepping in and out over the edge of the lower portion is made easy by providing a steering wheel assembly which can swing out of the way. The means for accomplishing this provides further weight and cost reduction by using the backbone as the steering post for supporting the steering shaft. This greatly increases the driver's safety, as there is no steering shaft "aimed" at him on which he may be impaled in the event of a severe front-end collision. This in turn contributes toward making this extremely light-weight car acceptable.

Objects and advantages of the invention will be more clearly apparent from the following description, and from the drawings.

DESIGNATION OF FIGURES

FIG. 1 is a profile of the electric vehicle. Broken lines illustrate the backbone housing the tray of power cells.

FIG. 2 is a pictorial view of a T-shaped tray containing power cells, although a straight line tray is now preferred.

FIG. 3 is a pictorial view showing the front of the vehicle, including a removable front hood of the body which facilitates easy insertion, removal, servicing, and inspection of the power cells. FIG. 3 also shows the steering wheel positioned in the right side of the vehicle.

FIG. 4 is a pictorial view illustrating portions of the backbone for housing the tray of power cells of FIG. 2, the body, and several of the principal members of the steering and front suspension systems.

Figure 9:
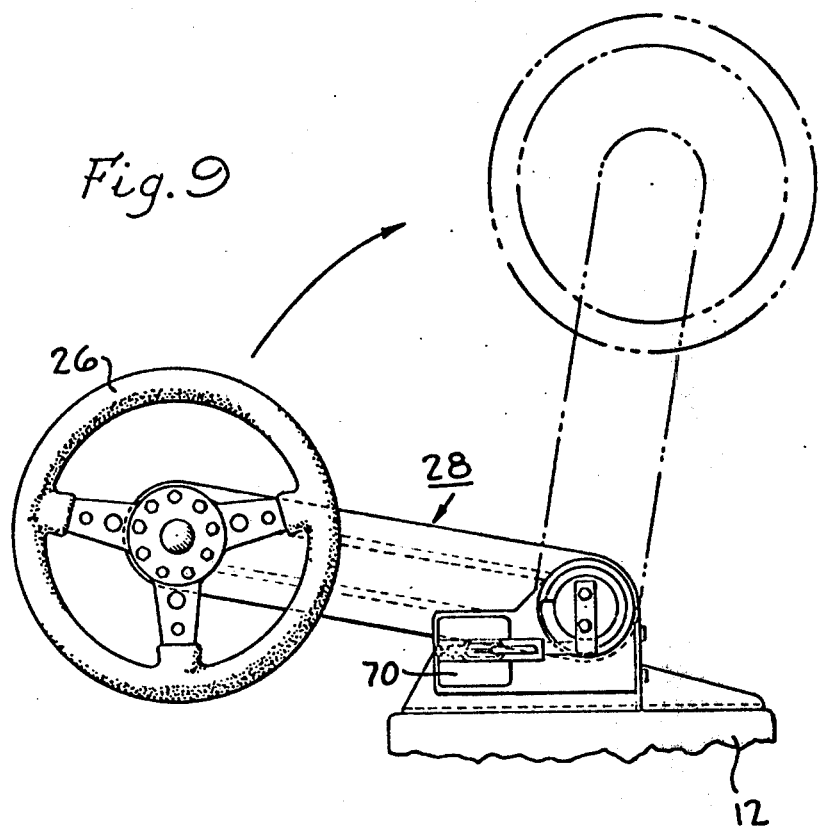

FIG. 9 is an elevation view of a steering wheel assembly, the position of which is adjustable to permit easy ingress and egress by the driver. FIG. 9 is a view as seen by an occupant in the left side of the vehicle. Solid lines show the steering wheel in a position which permits an occupant to drive from the left side of the vehicle, while phantom lines illustrate the steering arm swung approximately 90° to a position which allows the occupant easy entry into and exit from the vehicle.

Figure 10:
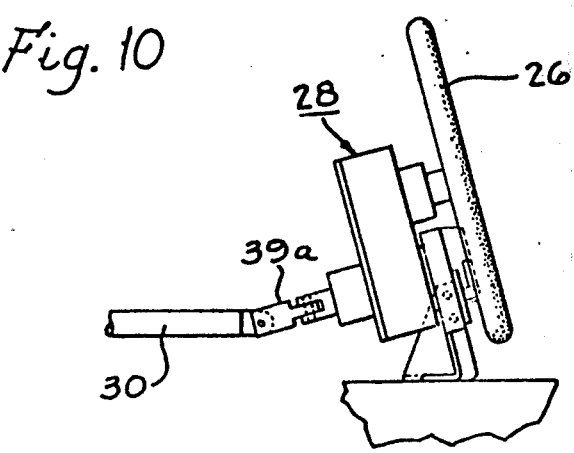

FIG. 10 is a side elevation of the steering wheel shown in FIG. 9.

FIG. 11 is a plan view of a form of the invention now preferred, a receiving rack for the battery tray being indicated at the front of the vehicle.

FIG. 12 is a view illustrating the battery tray now preferred.

FIG. 13 is a fragmentary broken-away view showing access to the motor and separable battery connectors.

FIG. 14 is a fragmentary vertical transverse sectional view through the backbone, showing the confining roller-ways now preferred. INTENT CLAUSE Although the disclosure herein offered for public dissemination in return for the grant of a patent is detailed to ensure adequacy and aid understanding, this is not intended to prejudice that purpose of a patent which is to cover each new inventive concept therein no matter how others may late disquise it by variations in form or additions or further improvements. The claims at the end hereof are intended as the chief aid toward this purpose, as it is these that meet the requirement of pointing out the parts, improvements, or combinations in which the inventive concepts are found.

DESCRIPTION OF THE T-TRAY EMBODIMENT

FIGS. 1 through 5 are helpful in illustrating several aspects of the invention. The vehicle 10 has a hollow backbone 12 (see FIGS. 1, 4 and 5) which provides a space for receiving a removable tray 14 carrying energy-producing power cells 16 such as batteries or fuel cells. The tray 14 and power cells 16 are illustrated in FIGS. 2 and 4. The backbone 12 shown in the drawings is rectangular in cross-sectional configuration and is shown in these figures as constructed in the shape of a T, the latter feature being one way of permitting the vehicle to have a large storage space for its power cells while simultaneously having a short wheel base. The T shape is not the preferred form of this invention. It should be noted that the tray distributes the weight of the power cells somewhat uniformly throughout the length of the vehicle, with the consequence that the vehicle has good road handling characteristics.

Figure 5:
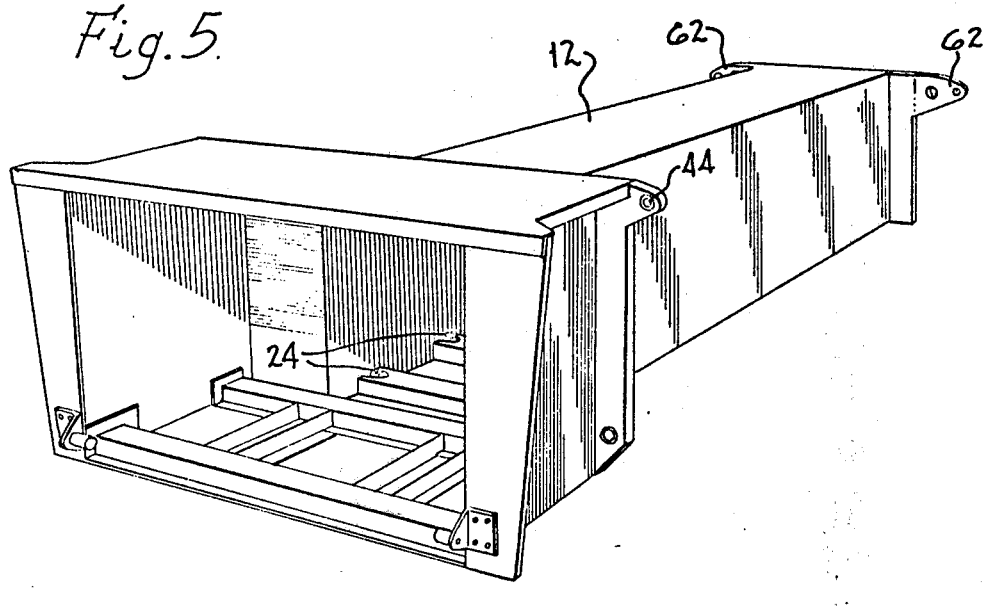
FIG. 5 is a pictorial view of the backbone without the tray of power cells.
Figure 6:
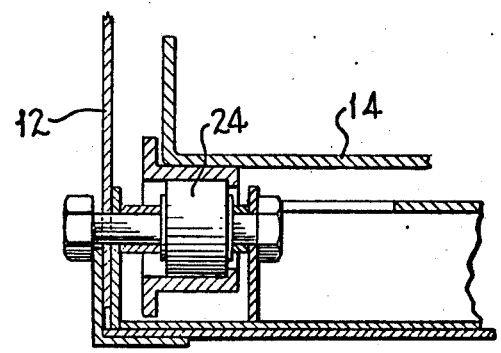
FIG. 6 is a front sectional view of a portion of the backbone illustrating rollers which permit easy insertion and removal of the tray of power cells into and from the backbone, although rollers carried by the tray are now preferred.
Figure 7:
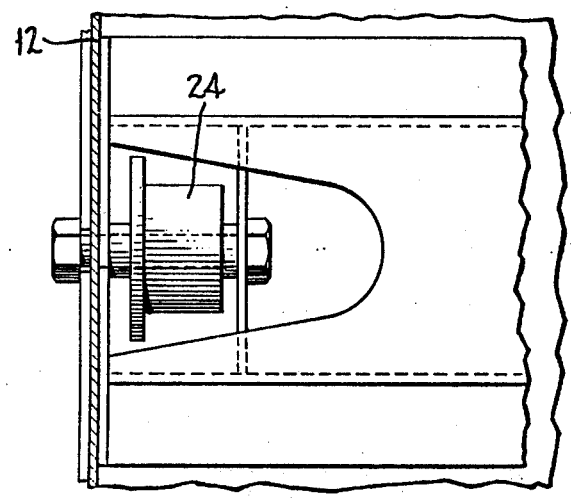
FIG. 7 is a view looking down on the inside portion of the backbone appearing in FIG. 6.

The vehicle 10 has a body 18, at the front of which (FIG. 3) is a door or hood 20 which may be opened, as by removal, to facilitate easy insertion, removal, servicing, and inspection of the power cells. The hood 20 may be attached to or detached from the remainder of the body by operating one or more latches 22; the mechanism for operating the latches may be located inside the vehicle to provide an anti-theft feature. As shown in FIGS. 5 through 7, the interior of the backbone may be provided with suitable rollers 24 so that the tray can easily be drawn out onto a companion roller-table (not shown). There must also be means which cooperate to prevent the tray of power cells from rolling out of the front of the backbone as a result of its momentum when the vehicle is decelerated. Preferably the tray 14 is provided with rearwardly directed plug-in facilities 25 so that connections will be made automatically when a replacement tray of fully charged batteries is "plugged in" when one set of batteries is nearly spent and recharging is not convenient. Also, such rear-located plug-in facilities (automatic or manual) avoid the necessity of extra cable length to allow the tray to draw out the connecting cable as the tray is withdrawn.

The backbone 12 and body 18 shown in the drawings, and as embodied in experimental cars, have been separately constructed. When assembled into the complete vehicle, the backbone 12 also serves the additional function of a structural frame or chassis for the vehicle which supports the body. A vehicle having a very low center of gravity may be achieved by shaping the body so that it fits down over the backbone; see FIG. 4. In FIG. 1 a dashed line 23 represents the seat support and floor line inside the vehicle.

The combination of the backbone containing power cells and a body shaped to be draped over the backbone may result in a car of such low profile as to make practicable a simplification which saves cost and weight. No side doors need to be provided. Ingress and egress by occupants is made possible by constructing the body in two portions, the top portion opening to permit the occupants to step in over the very low side. Such a construction is illustrated in FIGS. 1, 3 and 4. Referring to those views, the lower portion 70 of the body is shaped to fit down over the backbone and provide seating spaces for occupants on opposite sides of the backbone and extending approximately as low as the backbone. The upper portion or top 72 of the body 18 is connected to the lower portion 70 by suitable counterbalanced hinges 74 (shown diagrammatically by dashed lines in FIG. 1) so that the top may be swung upward (as shown by arrow 75 in FIG. 1) to afford access to the interior of the vehicle. The preferred form of hinge is a toggle hinge system inside the body and having springs for counterbalancing the top and holding it up once it is raised. If desired, the hinges may be located at the front or along a side of the vehicle rather than at the rear, with the result that the top will swing in a different direction. A body having a slidable section in the top, analogous to those used in certain small military aircraft, may alternatively be used to provide occupants access to the body. Where entry is as indicated, the occupants may open and close the top 72 by simple hand operations. The upper and lower portions of the body may be provided with cooperating components of a locking system so that only persons having proper keys can get into the car. A latching mechanism is provided in the vehicle to prevent the upper portion of the body from being lifted upward except when desired.

It should be understood that the backbone and tray of power cells may also be used with and may provide structural support for bodies which have doors on the sides. In at least one country safety standards make it necessary to use standard doors.

Several principal members of the steering and front suspension systems are illustrated in FIG. 4. The steering system includes such members as a steering wheel 26 and an arm 28 and universal joint 39a structurally linking the steering wheel 26 with steering shaft 30. The arm 28 comprises means for translating the rotation of the steering wheel 26 into rotation of the steering shaft 30. Rotation of the steering 30 is translated into appropriate motions of the front steerable wheels represented by hubs 32, by a rack pinion gear 34 which is connected to the shaft 30 by universal joint 39b. The gear 34 includes a tubular housing 36 which is secured to the backbone 12 by brackets 38. Steering spindles 31 for hubs 32 are pivotably secured to the backbone by suspension arms 40 and 42 which are coupled to the upper and lower ends of spindle 31 to give proper suspension action. Also secured to the backbone at mounting 44 is the upper end of a hydraulic shock absorber 46, the lower end of which is linked to the top of the suspension arm 42. A helical compression spring 48 is shown surrounding the shock absorber 46.

It will be noted that the steering and front suspension systems may either be secured directly to the backbone or be secured to the body. In either case these systems are supported by the backbone which acts as the chassis or principal structural member of the vehicle. Mounting directly on the backbone is greatly preferred.

Figure 8:
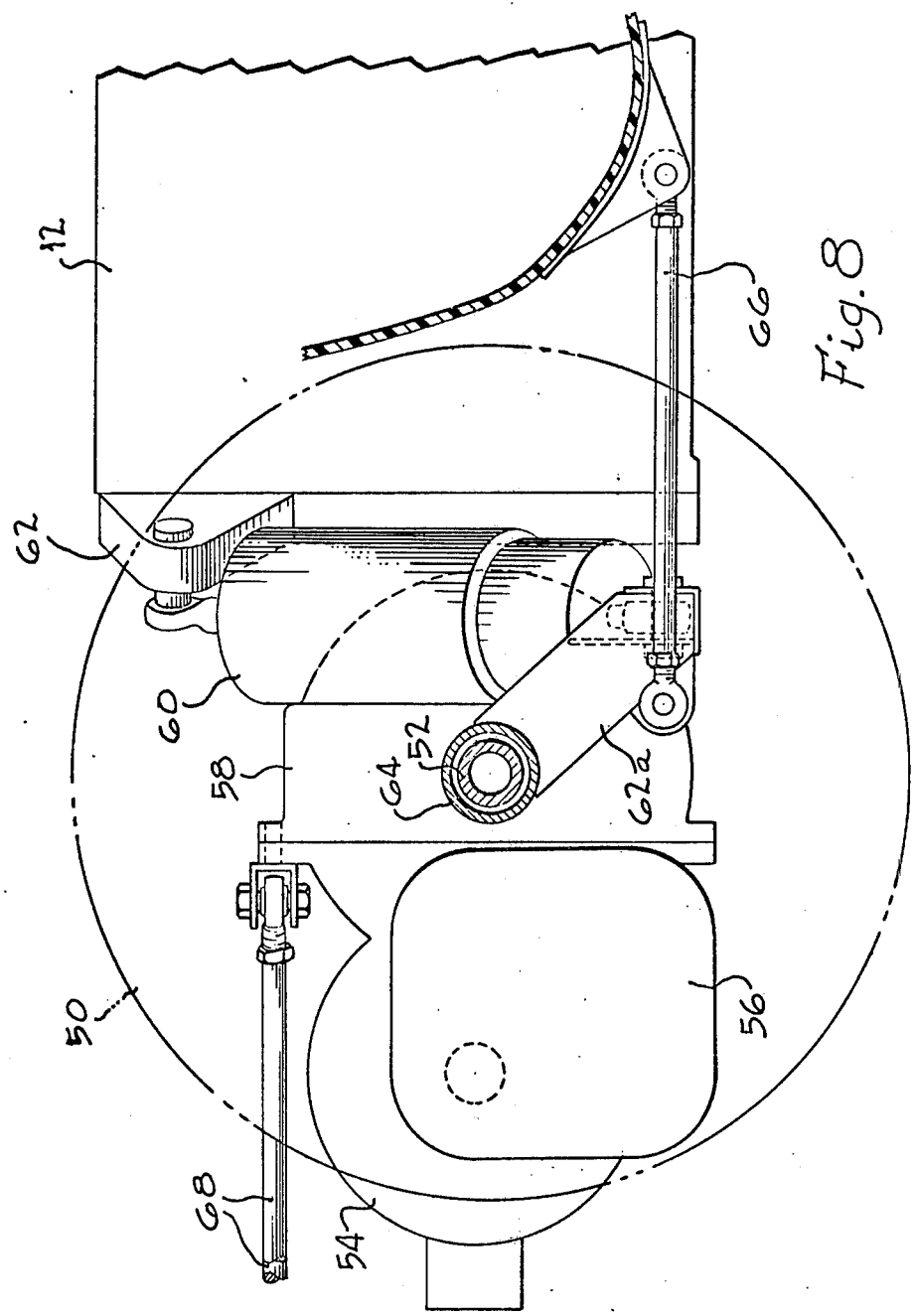
FIG. 8 is a side view illustrating schematically several of the principal members of one form of propulsion and rear suspension systems, not now preferred.

The propulsion system may comprise members such as an electric motor, a transmission, a differential, and associated axle and power-driven wheels supported by the backbone by an appropriate rear suspension system. FIG. 8 illustrates one version of these members schematically. Referring to FIG. 8, a phantom circular line 50 illustrates the power-driven rear wheels which are connected to and rotated by an axle 52, the axle in turn being rotated by the combined functions of an electric motor 54, transmission 56, and differential 58. The upper end of a rear hydraulic shock absorber 60 is pivotably secured to a mounting 62 at the top of the backbone, while the lower end of the shock absorber 60 is pivotably connected to one end of a bracket 62a, the other end of which is joined to the outer housing 64 which surrounds the axle 52. Shock absorbers 60 may carry helical springs as shown on front shock absorbers 46 in FIG. 4. FIG. 8 also shows one of the pair of links 66, one on each side of the vehicle, which are pivotably joined to the backbone or body and to the differential and axle housing 64. The upper portion of the rear axle and differential assembly is secured against fore and aft movement by a link 68 extending rearwardly. A link 69 which extends diagonally positions this assembly laterally. The rear ends of these links 68 and 69 may be secured to structural portions of the body or backbone as may be convenient.

For best use of the invention a steering system is provided in which the steering wheel is shiftable to permit easy ingress and egress by the driver. One particularly advantageous steering system which affords this advantage is illustrated in FIGS. 4, 9 and 10. In that system the steering shaft 30 is located laterally or offset from in front of the drivers's seat, thereby offering a safety feature by positioning the steering shaft so that it is not "aimed" at the driver's chest. Preferably it is near the longitudinal center line of the vehicle (midway between its sides) and is supported by the backbone. The steering wheel (a term used to include other like handles) should be in front of the driver. Thus steering wheel 26 mounted on arm 28 extending out from backbone 12 is in the usual position for the driver. Arm 28 may swing generally about the axis of the steering shaft 30, at least to an out-of-the-way position, as shown in FIG. 9. The construction may be such as to permit the arm to swing further to the right, to a right-hand steering position, where it is shown in FIG. 3. The system includes a clamp 70 which locks the arm 28 in a fixed position when the vehicle is being driven but which is releasable to permit swinging of the arm and steering wheel at other times. The steering wheel is coupled to the shaft 30 so that turning the steering wheel turns shaft 30. This may be by a chain and sprockets. Other steering wheel constructions which permit the driver to adjust the steering wheel to positions convenient to him may alternatively be used in this electric vehicle if desired.

A variety of materials may be used in the construction of the vehicle illustrated in the drawings. The body may be built from metals such as steel or aluminum or from nonmetallic materials such as reinforced fiberglass. The backbone should have a high ratio of strength to weight and be resistant to corrosion; these requirements can be met, for example, by stainless steel, other metals with corrosion-resistant coatings, or reinforced plastics.

As mentioned earlier, the vehicle illustrated in the drawings is one in which the body and the backbone are separately constructed. An alternative construction, probably preferred in mass production, and still embodying the principles of this invention is one in which the backbone is integrally constructed with the body. With that construction the combined backbone-body would function as a chassis which structurally supports the front and rear suspension systems, the steering system, and the propulsion system, the backbone still being an important structural member. With this alternative construction the hollow backbone portion of the body would still provide a space for receiving a removable tray carrying energy-producing power cells. The vehicle using this alternative construction could be built having the body in two portions, the front of the body could be provided with a removable hood to facilitate easy insertion, removal, servicing, and inspection of the power cells, and the steering system could include a steering wheel the position of which is adjustable.

The vehicle may be provided with other features not specifically illustrated in the drawings. The energy cells will be electrically connected together, either in a simple series connection or by other connections which may be desired; the cables or other electrical connections are not illustrated in the drawings. A device for recharging the power cells may be provided on board the vehicle if desired. Electrical circuits properly controlling and coordinating the functions of the batteries, motor, recharger, if any, and other electrical or electromechanical components of the vehicle are of course provided, and these circuits may take a wide variety of designs.

Of course suitable brake and lighting systems are provided.

DESCRIPTION OF PREFERRED FORM

In some respects, the form of the invention now preferred differs from that described above. A plan view of the chassis of the vehicle embodying a preferred form is shown in FIG. 11. In FIG. 11, the backbone 112 and battery tray 114 are relatively longer, extending through the axis of the rear wheels 50. This makes it possible with a given length of wheel base to provide substantially the same battery capacity with a straight-line battery tray such as is shown in FIG. 12, as would be provided by the shorter T-shaped battery tray described above. The straight-line backbone and battery tray are much preferred for simplicity of manufacture and for minimum storage and maneuvering space for a supply of replacement trays of batteries. As seen in FIG. 12, the battery tray 114 is preferably provided with rollers 124. This has advantages over the provision of rollers 24 in the backbone as previously described. A relatively simple rack 125, preferably having its own casters 126, can be moved into position in front of the vehicle so that the battery tray 114, with its batteries, may, by hand, be rolled out from backbone 112 to rack 125. The rack 125 with these batteries may then be rolled away, usually to a point of charging, and another rack with a replacement tray full of freshly charged batteries rolled into position and this replacement battery tray 114 rolled into the backbone of the vehicle.

Another advantage of having rollers 124 on tray 114 is that these rollers can be used in connection with a safety feature. The backbone 112 is made in part of stringers 127 along its bottom corners which provide a confining roll-way for rollers 124. If the car should roll over, the rollers come to rest on the upper panels of stringer 127 and prevent the batteries from falling onto the upper panel of backbone 112. Of course the batteries should be firmly secured in tray 114, anyway, as it is indicated diagrammatically by bands 128 in FIG. 14.

Additional improvements shown in FIG. 11 relate to the vehicle drive and rear wheel suspension. The electric motor 154 is carried by brackets 155 carried by the backbone 112. The shaft 156 extends outwardly from the motor at each end, that is, toward each side of the vehicle. On each end of shaft 156 is mounted the drive pulley assembly 158 of an automatic speed changing apparatus which includes also V-belt 159 and driven pulley assembly 161.

Although there are various types of automatic control of the speed changing device, the illustrated form is responsive to the RPM of motor 154. The wide spacing of the pulley halves of assembly 158 shown in FIG. 11 occurs at zero or low motor speed. When the motor reaches a predetermined speed, the pulley halves of assembly 158 begin to move toward one another, crowding belt 159 outwardly to have a longer effective radius of engagement with the drive assembly 158. The two halves of driven assembly 161 corresondingly moves apart (against increasing spring tension) to let the belt 159 move to successively shorter radii, thereby effectuating a very wide range of ratios between starting ratio and maximum speed ratio.

Driven assembly 161 is firm on a drive shaft which extends through tubular housing 162 to gear housing 163, in which a gear on the drive shaft meshes with a ring gear directly driving wheel 50.

Spring suspension is provided between wheels 50 and backbone 112 by springs 171, which may surround hydraulic shock absorbers as previously described. The springs 171 are compressed between a beam 172 and a fitting on gear housing 163. Gear housing 163, and tubular housing 162, are rigid with suspension bar 173 which, at each of its ends, is pivoted about a pin 174 carried by a bulkhead or stiffener bracket 175 carried by and as part of backbone 112. The springs 171 are so designed that at normal passenger load tubular housing 162 will be substantially horizontal and the pulley of assembly 161 will be substantially perfectly aligned with the pulley of assembly 158. Belt 159 accommodates the necessary variations from this perfect alignment which occur as the spring suspension functions, thereby making unnecessary universal joints for the drive shafts.

The lack of a differential gearing might seem to present a problem in cornering. The outside wheel 50 must rotate faster than the inside wheel 50. This differential speed is accommodated, probably partly by belt creepage and partly by some slight degree of torque responsiveness in assemblies 158. However, if one wheel loses traction, as on ice, the other wheel continues to be driven, and more than its usual share of the torque available from the motor can be delivered to it.

It is preferred that, as shown in FIG. 13, an access door or panel 181 be provided in the shelf 182 behind the driver's seat 183. This permits inspection, and to some degree servicing, of some of the drive parts and of connectors 186. This access door is especially advantageous if the connectors 186 are not so mounted as to be automatically plugged in when the battery tray is thrust home, but to need manual coupling. Manual coupling is used in the present experimental vehicle.

ACHIEVEMENT

Electric battery-driven passenger cars have been built and experimentally operated including nearly all of the features here described. Although tests may still be underway, early experience with the car established that acceptable range and other aspects of performance have been achieved. Speeds of 69 miles an hour have been attained and acceleration has been suitable for modern traffic conditions. The range may not have been fully determined but has been found to be about 100 miles at a steady speed of over 30 miles an hour, with standard batteries. The range at normal stop-and-go conditions and occasional higher speeds was found, for the form shown in FIGS. 1 to 10, to be somewhat less than this, perhaps a little over 65 miles (and more at substandard performance), but the motor and controls were probably not yet the best to be devised. Better range is expected with the form of FIG. 11. Its drive is very efficient, partly because its friction losses are low, and partly because it largely avoids slow speed motor operation at which current values are high with consequent dropping of voltage and waste of power by heat generation.

Contributing to these achievements is the ability, which proper use of the backbone according to this invention yields, for carrying a heavy load of batteries with a light vehicle weight. A set of batteries, with tray, weighting about 850 pounds has been carried in a vehicle which, without them, weighs less than this (about 765 pounds). This is a ratio of less than 1 to 1. Even assuming that required safety equipment not now present would add another 500 pounds, the ratio would still be as low as about 1.5 to 1.

I claim:

1. An electric vehicle comprising the combination of a chassis, a body, and a tray for energy-producing power cells;

the chassis including a hollow backbone providing a space therein extending, longitudinally of the chassis and the backbone, opening at one end and receiving the tray of power cells therein, the tray of cells being longitudinally removable therefrom by rolling action, the backbone being a main longitudinal structural member of the chassis;

the body having bottom portions close to the level of the bottom of the backbone to provide along each side of the backbone of useful body space;

a pair of wheels mounted on the backbone in spring-suspended relationship;

a motor carried by the backbone and having a single shaft projecting toward opposite sides of the vehicle, and for each side a belt-drive speed-change means driven by the shaft and driving the driven wheel on that side; the axes of all rotating parts driven by the motor having positions generally parallel to its shaft.

2. An electric vehicle according to claim 1 in which the axis of said driven wheels passes through the backbone.

3. An electric vehicle comprising the combination of a chassis, a body, and a tray for energy-producing power cells;

the chassis including a hollow backbone providing a space therein extending longitudinally of the chassis and the backbone, opening at one end and receiving the tray of power cells therein, the tray of cells being longitudinally removable therefrom by rolling action, the backbone being a main longitudinal structural member of the chassis;

the body having bottom portions close to the level of the bottom of the backbone to provide along each side of the backbone a useful body space;

a pair of wheels mounted on the backbone in spring-suspended relationship;

a motor carried by the backbone and having a single shaft projecting toward opposite sides of the vehicle, and for each side a belt-drive speed-change means driven by the shaft and driving the driven wheel on that side; the axes of all rotating parts driven by the motor having positions generally parallel to its shaft;

each of said driven wheels being carried by a drive shaft housing pivoted at its inner end about a pivot means carried by the backbone and allowing the relative movement of spring suspension.

4. An electric vehicle according to claim 3 in which the motor is mounted to the rear of the backbone, and the axis of the pivoted means is approximately horizontal and approximately intersects the axis of the motor shaft.

5. An electric vehicle comprising the combination of a chassis and a body, the chassis including a hollow backbone forming the main structural member of the vehicle and providing a space extending longitudinally therein and opening at one end for receiving a longitudinally removable tray carrying energy-producing power cells;

the body including a lower body molded to provide along each side of the backbone a compartment with a bottom, an inner wall adjacent to the backbone, and an outer wall;

a body top hinged to said lower body to be swung up for affording access to said compartments;

and a steering wheel assembly including an arm extending out from and supported pivotally at one end by the backbone and having at its other end a steering member pivoted thereon, the arm swinging between a lockable position extending into one compartment for steering by an occupant of that compartment and a position out of the way of an occupant entering or leaving the compartment by stepping over the outside wall when the top has been raised.

6. An electric vehicle comprising the combination of a chassis and a body, the chassis including a hollow backbone providing a space extending longitudinally therein and opening at one end for receiving a longitudinally removable tray carrying energy-producing power cells;

the body including a lower body molded to provide along each side of the backbone a compartment with a bottom, an inner wall adjacent to the backbone, and an outer wall;

and a steering wheel assembly including an arm extending out from and supported at one end by the backbone and having at its other end a steering member pivoted thereon, the arm swinging between a lockable position extending into one compartment for steering by an occupant of that compartment and a position out of the way of an occupant entering or leaving the compartment.

7. An electric vehicle comprising the combination of a chassis and a body, the chassis including a hollow backbone providing a space extending longitudinally therein and opening at one end for receiving a longitudinally removable tray carrying energy-producing power cells;

the body including a body providing a passenger position along each side of the backbone, a steering wheel assembly including an arm extending out from and supported at one end by the backbone and having at its other end a steering member pivoted thereon, the arm swinging between a lockable position extending laterally to place the steering wheel in front of one passenger position for steering by a driver in that position and a position out of the way of his entry or exit;

and a steering shaft extending close along the backbone and supported by it out of alignment with the driver, and operable by the steering wheel.

8. An electric vehicle comprising the combination of a chassis and a body, the chassis including a hollow backbone providing a space extending longitudinally therein and opening at one end for receiving a longitudinally removable tray carrying energy-producing power cells;

the body including a body providing a passenger position along each side of the backbone, a steering wheel assembly including an arm extending out from and supported at one end by the backbone and having at its other end a steering member pivoted thereon for steering by a driven in one passenger position;

and a steering shaft extending close along the backbone and supported by it out of alignment with the driver, and operable by the steering wheel.

9. A vehicle comprising the combination of a chassis and a body, the chassis including a hollow backbone providing useful space extending longitudinally therein;

the body including a body providing a passenger position along each side of the backbone;

a steering wheel assembly including an arm extending out from and supported at one end by the backbone and having at its other end a steering member pivoted thereon, the arm swinging between a lockable position extending laterally to place the steering wheel in front of one passenger position for steering by a driver in that position and a position relatively out of the way of his entry or exit;

and a steering shaft extending close along the backbone and supported by it out of alignment with the driver, and operable by the steering wheel.

10. A vehicle comprising the combination of a chassis and a body;

the chassis including a hollow backbone providing useful space within it extending longitudinally therein;

the body including a body providing a passenger position along each side of the backbone;

a steering wheel assembly including an arm extending out from and supported at one end by the backbone and having at its other end a steering member pivoted thereon for steering by a driver in one passenger position;

and a steering shaft extending close along the backbone and supported by it out of alignment with the driver, and operable by the steering wheel.

11. A vehicle comprising the combination of a chassis and a body, the chassis including a hollow backbone providing useful space extending longitudinally therein;

the body including a body providing a passenger position along each side of the backbone;

a steering wheel assembly including an arm extending out from and supported at one end by the backbone and having at its other end a steering member pivoted thereon, the arm swinging between two positions for right and left hand drive, respectively, each extending laterally to place the steering wheel in front of its respective passenger position for steering by a driver in that position, means for locking the arm during steering;

and a steering shaft extending close along the backbone and supported by it out of alignment with either driver, and operable by the steering wheel in either lockable position.

12. An electric vehicle comprising the combination of a chassis, a body, and a tray for energy-producing power cells;

the chassis including a hollow backbone providing a space therein extending longitudinally of the chassis and the backbone, opening at one end and receiving the tray of power cells therein, the tray of cells being longitudinally removable therefrom by rolling action;

the body having bottom portions close to the level of the bottom of the backbone to provide along each side of the backbone a useful body space;

the backbone being structurally of four-sided nature, being a main longitudinal structural member of the chassis, and being of a cross-section substantially uniform for a substantial length, and undiminished past the vertical axial plane of one set of wheels to the opening end so that the tray of cells of substantial length may be accommodated by rolling substantially horizontally into the backbone;

said backbone including inwardly open channel member roller ways along substantially the bottom thereof into which rollers carried on the tray extend between flanges of the channel members, and which, in the event of roll-over of the vehicle, would support the tray and fuel cells secured to it by engagement of the rollers on the flange normally above the rollers, free from contact of the battery tops against adjacent structure.

* * * * *

UNITED STATES PATENT AND TRADEMARK OFFICE
CERTIFICATE OF CORRECTION

PATENT NO. : 3,983,952
DATED : Oct. 5, 1976
INVENTOR(S) : Robert S. McKee

It is certified that error appears in the above-identified patent and that said Letters Patent are hereby corrected as shown below:

```
     Col. 3, line 3, "INTENT CLAUSE" should be a heading
for the paragraph which follows it.
     Col. 3, line 9, change "late disquise" to -- later
disguise -- .
     Col. 4, line 47, after "steering" insert -- shaft -- .
     Col. 4, line 49, after "rack" insert -- and -- .
     Col. 7, line 22, "moves" should read -- move -- .
     Col. 8, line 4, before "miles" change "69" to -- 60 -- .
     Col. 8, line 26, change "weighting" to -- weighing -- .
     Col. 8, line 37, delete the comma after "extending".
     Col. 10, line 27(?), "driven" should read -- driver -- .
```

Signed and Sealed this

Twenty-second Day of February 1977

[SEAL]

Attest:

RUTH C. MASON
*Attesting Officer*

C. MARSHALL DANN
*Commissioner of Patents and Trademarks*